United States Patent [19]

Faulkner

[11] Patent Number: 4,850,548
[45] Date of Patent: Jul. 25, 1989

[54] FISHING REEL TRIGGER

[76] Inventor: Clarence F. Faulkner, 104 N. Nixon St., Carrollton, Ga. 30117

[21] Appl. No.: 251,537

[22] Filed: Sep. 30, 1988

[51] Int. Cl.$^4$ .............................................. A01K 89/02
[52] U.S. Cl. .................................. 242/256; 242/84.1 J
[58] Field of Search ............................ 242/84.1 J, 211

[56] References Cited

U.S. PATENT DOCUMENTS

| 873,784 | 12/1907 | Reichardt | 242/211 X |
| 1,974,640 | 9/1934 | Bryant | 242/84.1 J |
| 2,836,995 | 6/1958 | Heddy | 242/84.1 J |

FOREIGN PATENT DOCUMENTS 22420 of 1912 United Kingdom ................ 242/211

Primary Examiner—Stuart S. Levy
Assistant Examiner—Katherine Matecki
Attorney, Agent, or Firm—Jones, Askew & Lunsford

[57] ABSTRACT

The invention provides a take up trigger for a fishing reel which includes an annular overrunning clutch, having a lock mode and an overrun mode, annularly fitted onto the shaft of the fishing reel with a trigger lever extending from the housing on the clutch, the clutch being oriented on the shaft such that the clutch overrun mode corresponds to the reel take up mode, whereby the clutch lock mode necessarily corresponds to the trigger take up mode.

8 Claims, 3 Drawing Sheets

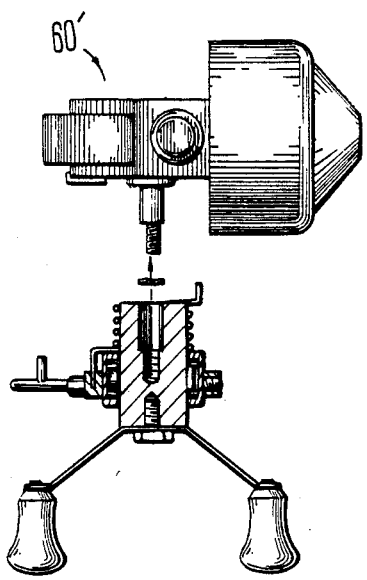
FIG 7
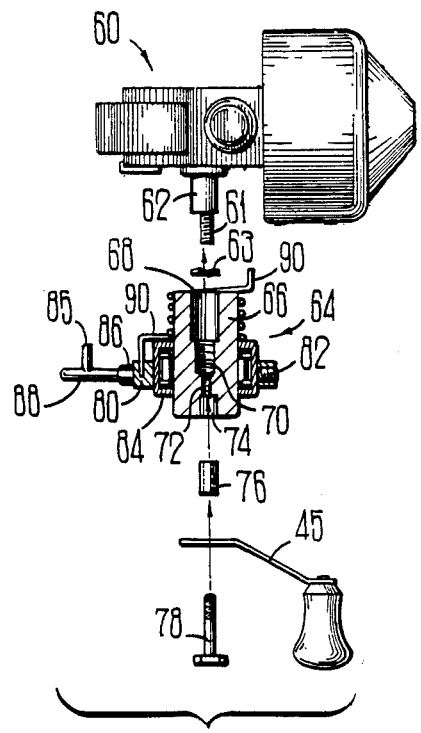
FIG 5
FIG 6

FISHING REEL TRIGGER

BACKGROUND OF THE INVENTION

This invention relates generally to fishing reels and specifically to take up actuators for fishing reels.

Rod and reel fishermen frequently have need to net a hooked fish while landing the fish, that is, at the point where the fish is nearly reeled in. However, this is frequently awkward since both hands are occupied, one with holding the rod, and the other with reeling in the hooked fish.

Therefore, there is a need for a take up device on a fishing reel to facilitate netting a hooked fish.

SUMMARY OF THE INVENTION

It is an object of the invention to provide an auxiliary take up mechanism on a fishing reel which can be actuated with the same hand as that holding the fishing rod, so that the other hand is left free to net a hooked fish near the end of the reel take up.

The invention is directed to a take up actuator which can be mounted on the shaft of a fishing reel, and facilitates netting of a hooked fish caught with a rod and reel after reeling in most of the line. The fisherman in landing his catch would typically hold the fishing net with his left hand and continue taking up the remaining fishing line with his right hand until the fish can be netted.

Accordingly, the invention provides a take up trigger for a fishing reel which includes an annular overrunning clutch, having a lock mode and an overrun mode, annularly fitted onto the shaft of a fishing reel with a trigger lever extending from the housing of the clutch, which is oriented on the shaft such that the clutch overrun mode corresponds to the reel take up mode whereby the clutch lock mode necessarily corresponds to the trigger take up mode.

In operation, when the trigger is squeezed, the shaft of the reel is turned to take up line. When the trigger is returned to its initial position, no torque is exerted on the reel shaft, that is, it overruns the shaft. However, when the reel shaft is turned in normal operation using the handle of the reel, no resistance is provided by the overrunning clutch.

The take up actuator optionally includes a return bias, such as a spring, to return the take up trigger to its initial position after the trigger is squeezed.

Optionally, the overrunning clutch is provided with a selectable gear ratio or torque such that a fisherman can select the amount of line taken up by each squeeze of the trigger.

Other features, objects, and advantages of the invention will become apparent from the following detailed description, drawings, and claims.

BRIEF DESCRIPTION OF THE DRAWINGS

FIG. 5 is a cross-sectional plan view of a second embodiment of the take up trigger with extension adapter.

FIG. 6 is a cutaway perspective view of the take up trigger mechanism and adapter of FIG. 5.

FIG. 7 is a cross-sectional plan view of a third embodiment of the take up trigger with adapter.

DETAILED DESCRIPTION

Figure 1:
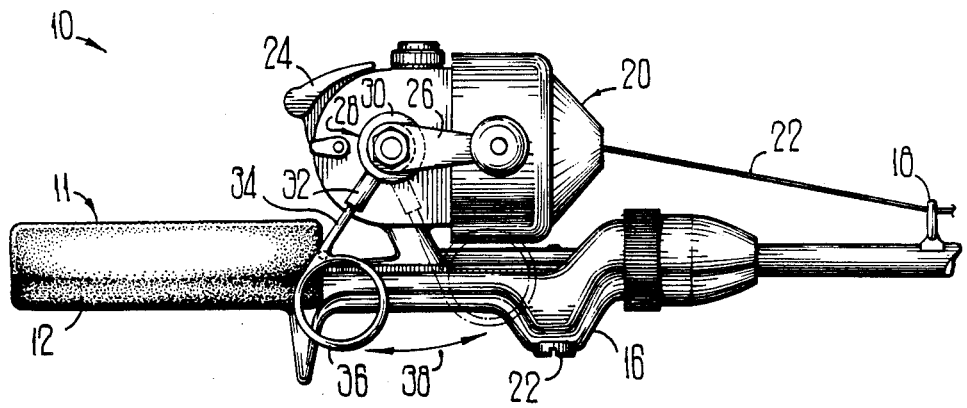
FIG. 1 is a right elevation view of a spin cast fishing reel modified with a take up trigger according to a first embodiment of the invention.
Figure 2:
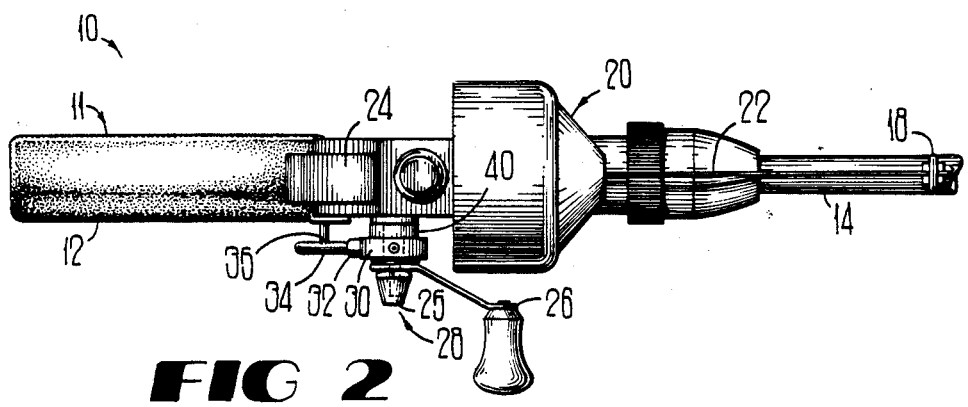
FIG. 2 is a plan view of the reel of FIG. 1.

Referring now in detail to the drawings, FIG. 1 shows a fishing rod and reel combination 10 improved in accordance with a preferred embodiment of the invention. The conventional fishing rod 11 has a handle 12, a shaft 14, a reel mount 16 with a mounting screw 22, and a number of line guides 18 for line 22. A spin-cast reel 20 is secured in the reel mount 16.

In FIG., 2, a plan view of the rod and reel 10 is shown. The spin cast reel 20 is conventional, but improved with respect to addition of a take up trigger 28 in accordance with the invention. The conventional spin cast reel 20 mounts above the rod and line 22 pays off an interior fixed spool upon casting and releasing the inner reel mechanism by depressing a casting release button 24. The reel 20 has handle 26 secured to a take up shaft 23 with a terminal lock nut 25. The take up trigger 28 includes an overrunning clutch annularly secured onto a take up shaft 23. The clutch 40 is fitted with an annular collar 30 with a trigger holder 32 for holding the trigger 34. As shown in FIG. 1, the trigger 34 terminates in a finger ring 36. The trigger is free to travel over an arc 38 until a lateral stop 35 extending laterally inside the finger loop 36 makes contact with the underside of the reel mount 16. The purpose of the stop 35 is to maintain the finger loop 36 generally below the rod 11 so that the finger loop may be conveniently engaged with a finger when needed.

Bias means to return the trigger to the prestroke forward position may be provided, such as a coil spring as shown in FIG. 5. The finger ring is optional when such return means are provided, that is, a relatively straight trigger may be more convenient.

Figure 3:
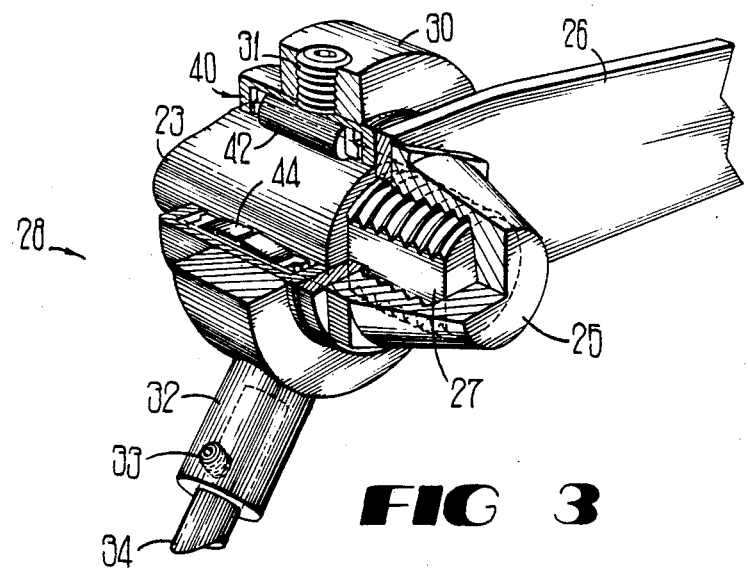
FIG. 3 is a cutaway perspective view of the take up trigger mechanism.

In FIG. 3, the take up trigger 28 is shown in cut-away perspective. To install the take up trigger 28 on reel shaft 23, the lock nut 25 is unscrewed from the threaded and keyed terminus 27 of the reel shaft 23, followed by removing handle 26 from the keyed terminus 27, which is keyed to rotatably secure the reciprocally keyed handle. The annular overrunning clutch 40 is then press fitted onto the reel shaft 23, followed by reinstalling the handle 26 and the lock nut 25. The clutch 40 is surrounded by the annular collar 30 to support the trigger holder 32. The trigger shaft 34 is secured in the holder 32 by a set screw 33. The effective trigger length 34 can be adjusted for hand size by selecting the extent of insertion into the holder 32. Alternatively, the collar 30 and holder 32 could be eliminated by integrally forming the clutch housing 40 in the trigger 34.

The overrunning clutch operates by rollers 42 being free for rotation in only one direction, while constrained by leaf springs 44. Overrunning clutches are commercially available in a wide range of sizes, such as from the Torrington company of Torrington, Connecticut.

In practical operation during fishing, a cast is made in conventional manner, followed by reeling in the line. At the conclusion of reeling in a hooked fish, it is often desirable to net the fish. The take up trigger is most useful during the final take up and netting. As the fish is brought in, the take up trigger is actuated using the index finger of the right hand which holds the rod, while the left hand is free to handle the fish net.

Figure 4A:
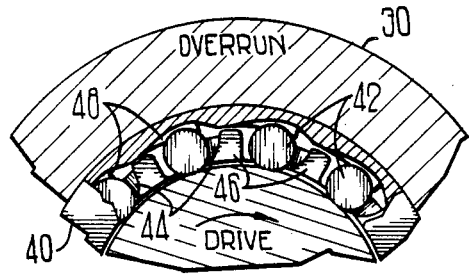
FIGS. 4A to 4D illustrate the operational modes of the mechanism.

In FIGS. 4A to 4D, the four operational modes of the overrunning clutch 40 are shown during operation of the fishing reel 20. In FIG. 4A, the overrun mode is adapted to normal reeling. While reeling in fishing line using handle 26, the reel shaft 23 is driven, and the clutch 40 overruns or is idle. Forward rotation of shaft 23 causes rollers 42 to be urged forward against the respective leaf springs 44. This forward urging in turn causes a roller 42 to be urged away from a locking cup ramp 48 located toward the outer periphery of the clutch.

Figure 4B:
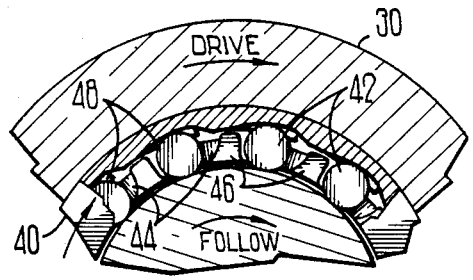

In FIG. 4B, the lock mode is adapted to slow take up using the take up trigger. During slow take up, the clutch housing 30 is rotatably driven forward, while the reel shaft 30 rotatably follows. As the clutch is driven forward, the rollers assisted by the leaf springs 44 become wedged between the locking ramps 48 and the shaft 23 to transmit torque between the driven clutch and the reel shaft.

Figure 4C:
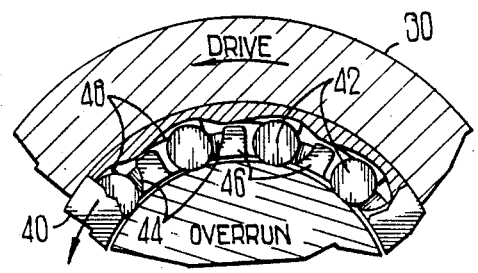

In FIG. 4C, return of the take up trigger to its forward position in preparation for another take up stroke is shown. The clutch 40 is driven rearward and overruns the stationary reel shaft 23. The relative motion of the clutch 40 and the shaft 23 cause the rollers 42 to move out of their locked position in locking ramps 48.

Figure 4D:
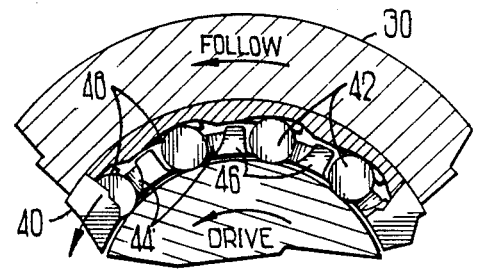

In FIG. 4D, an antibacklash mode is indicated. Backlash does not occur in spin cast reels, but does occur with the older style spool type reels. Upon casting, if the spool were caused to be abruptly reversed, the clutch would be locked and the lateral contact 35 would engage the fishing rod, thus stopping the backlash.

The configuration of FIG. 4A corresponds to the clutch-overrun mode. The configuration of FIG. 4B corresponds to the clutch-lock mode. The configuration of FIG. 4C corresponds to the shaft-lock mode. The present invention requires the clutch be configured on the reel shaft such that the clutch overrun mode corresponds to the reeling function, that is, as shown in FIG. 4A. The function of the mode of FIG. 4B, that is, the slow take up function, and the slow take up function of FIG. 4C necessarily follow.

The present invention is readily adaptable to reels other than the spin cast reel shown in the drawings, including the older spool type reel and the spinning reel mount which is mounted under the fishing rod. Adaption of the fishing reel trigger to the spool type reel would not be substantially different from the above discussion. Adaption to the spinning reel would involve orienting the trigger upwardly for convenient finger operation.

The overrunning clutch is selected to have a torque rating commensurate with a desired fishing line rated strength. For example, a clutch having a rated torque of about 18 inchpounds is adequate for a 20 pound fishing line. If the torque exerted on the clutch during slow takeup exceeds the rated torque, then the clutch will slip.

In FIG. 5, another embodiment of the invention is shown in which a spin cast reel 60 is retrofitted with a take up trigger 64. The take up trigger includes an annular overrunning clutch 84 on a shaft extension 66, the purpose being that the reel shaft 62 is not long enough to receive an annular clutch of convenient size.

FIG. 6 shows the take up trigger 64 installed on the reel shaft 62 in cutaway perspective. The extension 66 includes an internal bore 68 sized to fit onto the diameter of shaft 62. The bore 68 has a threaded counterbore 70 which screws onto the threaded end 61 of shaft 62.

The extension 66 has a wrenching surface 75 at its outer end so that the extension may be tightly turned onto the reel shaft. A lock washer 63 is interposed to facilitate the securement. The outer end of the extension 66 includes a key bore 74 with a threaded counterbore 72. A keyed fitment 76 is inserted into the keyed bore 74. The keyed fitment 76 receives a reciprocally keyed handle 65. Finally, a bolt 78 secures the handle 65 and the fitment 76 upon being turned into the threaded end counterbore 72.

An annular overrunning clutch 84 is annularly fitted onto the extension 66. The clutch 84 includes sets of internal rollers 92 and cooperating leaf springs 94, as discussed above. A collar 80 extends around the clutch 84 and is secured thereon by set screw 82. The collar 80 includes a trigger recess 86 into which a trigger 88 is secured by a set screw 82.

A coil spring 90 is provided around the extension 66 which functions to automatically return the trigger 88 to a forward position following a slow take up stroke. One end of the coil spring is affixed to the collar 80 as indicated at 91. The other end of the coil spring is affixed to the side face of the reel, for example, by a drilled hole 60. The trigger need not include a finger loop as in the previous embodiment. A plain trigger may be easier to use than one with a finger loop. A lateral trigger stop 85 is provided on the inside of the trigger 88, as seen in FIG. 5, which functions to define the arc of travel of the trigger, in a manner as discussed in connection with FIG. 1.

FIG. 7 shows a slightly modified variation having a simplified handle arrangement. A take up trigger 64' is substantially similar to the take up trigger 64 of FIGS. 5 and 6 except that a reel handle 96 is bolted directly to the outer end of the extension 66' by a bolt 98. Thus, the internal threaded counterbore 70' need not extend to the outer end of the extension 66'.

While the invention has been described in detail with particular reference to the disclosed embodiments, it is to be understood that variations and modifications may be utilized without departing from the principles and scope of the invention as defined by the following claims.

What is claimed is:

1. A take-up trigger mechanism for a fishing reel mounted on a fishing rod and having a take-up shaft and a crank operative to rotate the shaft for operating the reel in a take-up mode, the mechanism comprising:

an overrunning clutch having concentric annular inner and outer elements, and means operatively disposed between the inner and outer elements to provide a lock mode transmitting torque between the two elements in a first direction of relative motion and an overrun mode disengaging the two elements in the opposite direction;

means attaching the inner element of the clutch to the shaft of the reel so that the inner element always rotates with the shaft;

a trigger lever radially extending from the outer element for manual reciprocation in either a take-up direction or a return direction by an operator of the fishing reel, independently of the crank; and the clutch being oriented on the shaft so that the clutch operates in the lock mode to drive the shaft in response to moving the trigger lever in the take-up direction, and operates in the overrun mode not to drive the shaft in response to moving the trigger in the return direction, whereby alternately reciprocating the trigger lever slowly operates the reel in the take-up mode.

2. The take-up trigger mechanism of claim 1 further comprising means for biasing said trigger lever in its return direction.

3. The take-up trigger mechanism of claim 1 wherein said trigger lever terminates in a ring configuration adapted to receive an operator's finger.

4. The take-up trigger mechanism of claim 1 wherein said clutch is operative to transmit a selected maximum torque less than a desired fishing line rated strength, so that the clutch slips before the maximum strength of the fishing line is reached.

5. The take-up trigger mechanism of claim 1 further comprising a trigger stop on the trigger lever and configured to engage said fishing rod at predetermined extremes of trigger reciprocation.

6. The take-up trigger mechanism of claim 1 wherein the shaft of the fishing reel has a handle end and a non-handle end, and wherein said trigger is mounted on the handle end of the shaft.

7. The take-up trigger mechanism of claim 1 wherein the shaft of the fishing reel has a handle end and a non-handle end, and wherein said trigger is mounted on the non-handle end of the shaft.

8. The take-up trigger mechanism of claim 1, wherein the fishing reel includes an outer housing and the take-up shaft extends outside the housing for operative connection with the crank, and wherein:

the clutch is mounted on the shaft outside of the reel housing, so that the trigger mechanism is easily retrofitted to an existing reel; and the trigger lever extends radially from the outer element of the clutch on the outside of the housing.

* * * * *